US011950098B2

(12) United States Patent
Wood et al.

(10) Patent No.: US 11,950,098 B2
(45) Date of Patent: Apr. 2, 2024

(54) AUTOMATIC CONNECTIVITY FOR VOICE OVER WI-FI CALLS

(71) Applicants: AT&T Intellectual Property I, L.P., Atlanta, GA (US); AT&T Mobility II LLC, Atlanta, GA (US)

(72) Inventors: Andrew Wood, Seattle, WA (US); Karen Stansbury, St. Simons Island, GA (US); Nicholas Thompson, Lake In The Hills, IL (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 236 days.

(21) Appl. No.: 17/478,778

(22) Filed: Sep. 17, 2021

(65) Prior Publication Data
US 2023/0089708 A1 Mar. 23, 2023

(51) Int. Cl.
*H04M 1/66* (2006.01)
*H04W 12/102* (2021.01)
*H04W 12/60* (2021.01)
*H04W 48/14* (2009.01)
*H04W 48/16* (2009.01)

(52) U.S. Cl.
CPC ......... *H04W 12/102* (2021.01); *H04W 12/66* (2021.01); *H04W 48/14* (2013.01); *H04W 48/16* (2013.01)

(58) Field of Classification Search
CPC ... H04W 12/102; H04W 12/66; H04W 48/14; H04W 48/16
USPC ........................................................ 455/411
See application file for complete search history.

(56) References Cited

U.S. PATENT DOCUMENTS

| 2017/0126705 | A1* | 5/2017 | Mirashrafi ............ H04L 63/102 |
| 2017/0135031 | A1* | 5/2017 | Buckley ................. H04W 48/18 |
| 2021/0068019 | A1* | 3/2021 | Cuevas Ramirez ......................... H04W 36/385 |

* cited by examiner

*Primary Examiner* — Temica M Beamer
(74) *Attorney, Agent, or Firm* — Hartman & Citrin LLC

(57) ABSTRACT

A UE can enable a VoWIFI service, receive hidden SSID information, and register with a core network via a RAN. The UE can monitor a first signal strength of a first signal from the RAN. The UE can scan for a second signal from a WLAN, and when found, can measure a second signal strength of the second signal. The UE can determine whether the first signal strength is at or below a first threshold. If so, and if the WLAN is untrusted, the UE can probe it with the hidden SSID information. If the untrusted WLAN responds, the UE can send an access request to an untrusted WLAN access point. The UE can receive, via the untrusted WLAN access point, an authentication challenge from an ePDG. If the UE passes the authentication challenge, the UE can register with the core network via the untrusted WLAN and the ePDG.

20 Claims, 7 Drawing Sheets

AUTOMATIC CONNECTIVITY FOR VOICE OVER WI-FI CALLS

BACKGROUND

Mobile network operators are unable to provide cellular coverage in all areas due to terrain, building materials, regulatory restrictions, and other reasons. In an effort to provide broader coverage to their customers, many mobile network operators support voice over WI-FI calling ("VoWIFI"). Mobile network operators may provide VoWIFI over a trusted WI-FI network that can interact directly with the evolved packet core ("EPC") network to connect calls. Mobile network operators may also provide VoWIFI over untrusted WI-FI networks through an evolved packet data gateway ("ePDG"). The ePDG facilitates secure access between the EPC and untrusted non-3GPP networks.

In many cases, customer access to untrusted WI-FI networks is unavailable because of password protections, such as WI-FI Protected Access ("WPA") protocol and its versions. Password sharing may be viable under some circumstances, such as friends sharing their WI-FI passwords, but this can be an inconvenience for both parties. Under other circumstances, an individual or business may be unwilling to the share service set identifier ("SSID") and password to access their WI-FI network.

SUMMARY

Concepts and technologies disclosed herein are directed to automatic connectivity for VoWIFI calls. According to one aspect of the concepts and technologies disclosed herein, a user equipment ("UE") can include a processor and a memory. The memory can include instructions that, when executed by the processor, cause the processor to perform operations. In particular, the UE can enable a VoWIFI service, receive hidden SSID information, and register with a core network via a radio access network ("RAN"). The UE can monitor a first signal strength of a first signal from the RAN. The UE can scan for a second signal from a wireless local area network ("WLAN"), and when the second signal is found, can measure a second signal strength of the second signal. The UE can determine whether the first signal strength is at or below a first threshold. In response to determining that the first signal strength is at or below the first threshold, the UE can determine if a WLAN is available and is an untrusted WLAN. In response to determining that the WLAN is potentially an untrusted WLAN, the UE can probe the untrusted WLAN with the hidden SSID information. The UE can determine whether an untrusted WLAN access point associated with the untrusted WLAN responds to the hidden SSID information. In response to determining that the untrusted WLAN access point responds to the hidden SSID information, the UE can generate an access request and send the access request to the untrusted WLAN access point using the hidden SSID information. The UE can receive, via the untrusted WLAN access point, an authentication challenge (e.g., based upon subscriber identity module ("SIM") information) from an ePDG operating in the core network. The UE can respond to the authentication challenge with an authentication response directed to the ePDG. In response to the UE being authenticated to access the untrusted WLAN for registration with the core network, the UE can register with the core network via the untrusted WLAN and the ePDG. The UE can then complete, at least in part, a communication using WLAN resources allocated to the UE by the untrusted WLAN access point. The communication can be a voice call or other communication, such as a message (e.g., text or multimedia).

In some embodiments, the UE can receive the hidden SSID as part of a provisioning process. The provisioning process can also include provisioning the untrusted WLAN access point with the hidden SSID information.

In some embodiments, the RAN is or includes a Third Generation Partnership Program ("3GPP") access network. For example, the RAN can be an Evolved-Universal Mobile Telecommunications System Terrestrial Radio Access Network ("E-UTRAN") although other RANs are contemplated. The untrusted WLAN can be or can include an untrusted non-3GPP access network.

In some embodiments, the UE can enable the VoWIFI service via a standalone VoWIFI application installed on the UE. In other embodiments, the UE can enable the VoWIFI service via an operating system setting that is available in an operating system installed on the UE.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein are directed to automatic connectivity for VoWIFI calls. The disclosed solution enables private/protected WI-FI networks to support seamless VoWIFI calls from a UE without the need to share WI-FI network SSID and password information. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
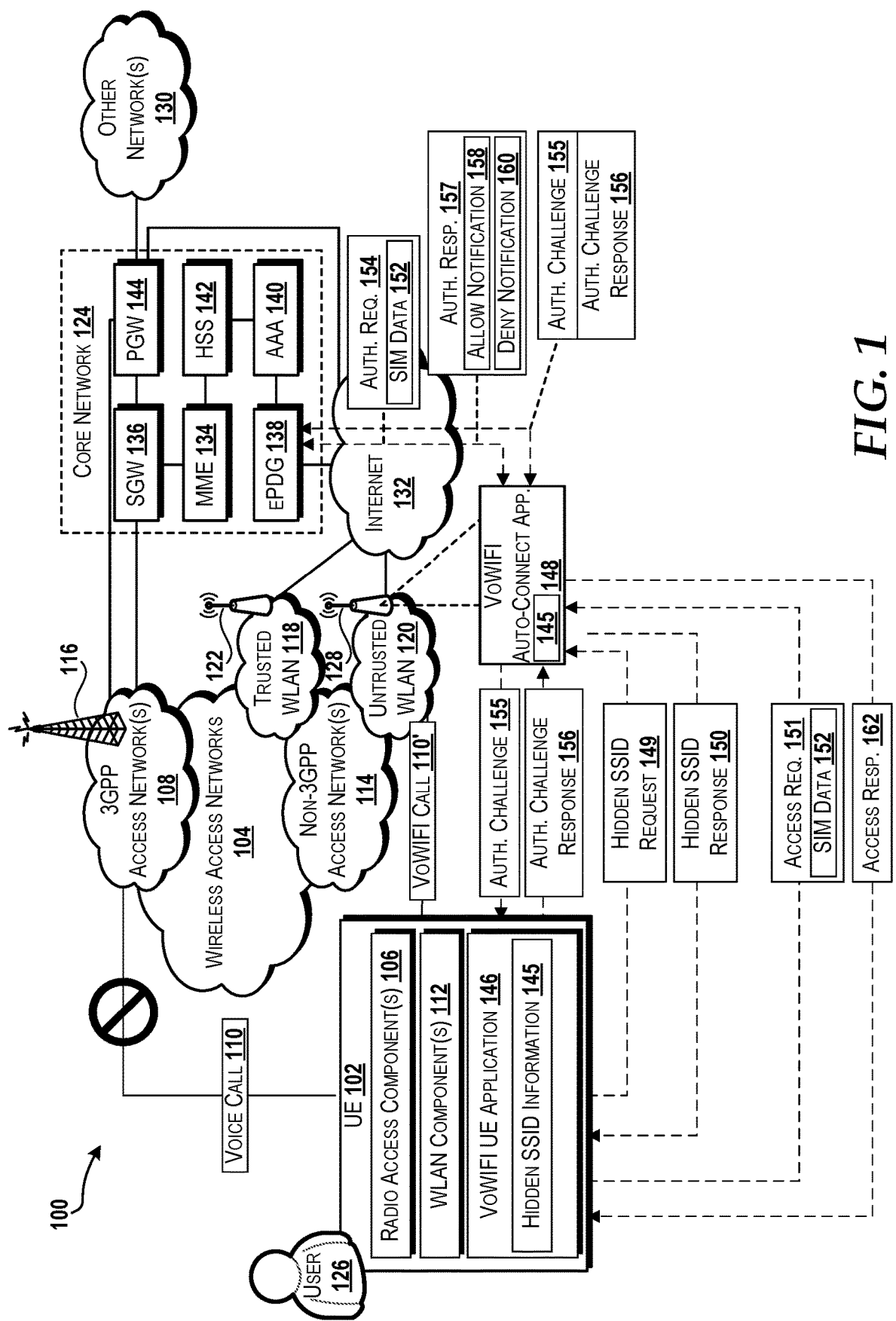
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The operating environment 100 includes a UE 102 that can operate in communication with one or more wireless access networks 104. In particular, the UE 102 can be a cellular phone, a feature phone, a smartphone, a mobile computing device, a tablet computing device, a connected vehicle, a "smart" device, or the like. The UE 102 can include one or more radio access components 106 (hereafter referred to collectively as "radio access components 106" or individually as "radio access component 106") that facilitate wireless communication with one or more 3GPP access networks 108 (hereafter referred to collectively as "3GPP access networks 108" or individually as "3GPP access network 108"). In the illustrated example, the UE 102 has either lost connection to the 3GPP access network 108 or the strength of the signal received from the 3GPP access network 108 is below a pre-defined threshold (e.g., below −100 decibels) such that a voice call 110 may be degraded or unable to be completed, or otherwise may be better served by one or more non-3GPP access networks 114 (hereafter referred to collectively as "non-3GPP access networks 114" or individually as "non-3GPP access network 114") via one or more Institute of Electrical and Electronics Engineers ("IEEE") 802.11X standards (hereafter referred to as "WI-FI"). More particularly, the UE 102 can also include one or more wireless local area network ("WLAN") components 112 (hereafter referred to collectively as "WLAN components 112" or individually as "WLAN component 112") that facilitate wireless communication with a trusted WLAN 118 or an untrusted WLAN 120 over which the voice call 110 can be handled. It should be understood that although a voice call 110 is described herein, the concepts and technologies disclosed herein can be applied to other forms of communications, including, but not limited to, text messaging and multimedia messaging (e.g., text, audio, video, image, or a combination thereof).

The 3GPP access networks 108 can be implemented as a Global System for Mobile communications ("GSM") RAN ("GRAN"), a GSM Enhanced Data rates for Global Evolution ("EDGE") RAN ("GERAN"), a Universal Mobile Telecommunications System ("UMTS") Terrestrial RAN ("UTRAN"), an Evolved UTRAN ("E-UTRAN"), a 5G New Radio ("5G NR") access network, a virtualized RAN, an open RAN, future generation RANs (e.g., 6G, 7G, etc.), any combination thereof, and/or the like. Moreover, the 3GPP access networks 108 can utilize various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), future multiple access radio technologies, and/or the like.

The 3GPP access networks 108 can include one or more service areas (also known as "cells") having the same or different cell sizes, which may be represented by different cell-types. As used herein, a "cell" refers to a geographical area that is served by one or more base stations 116 operating within the 3GPP access networks 108. A "base station" refers to a radio receiver and transmitter (collectively, "transceiver") that is configured to provide a radio/air interface over which the UE 102 and other UEs (not shown) can connect. The base stations 116 can be or can include one or more base transceiver stations (for GSM), one or more node Bs ("NB" for UMTS), one or more evolved node base ("eNB" for LTE), and/or one or more next generation node Bs ("gNB" for 5G). In some implementations, for example, the base station 116 embodied as a gNodeB may also include an eNodeB to facilitate backwards compatibility with older technologies that may have better overall coverage in certain areas. Each base station 116 can include one or more radio components used to generate radio waves to be broadcast by an antenna system. In particular, each base station 116 can include one or more processing units, one or more memory components, one or more baseband units ("BBUs"), one or more remote radio heads ("RRHs"), one or more operating systems, one or more applications, and one or more antenna systems (including antenna arrays and any associated firmware and/or software).

The non-3GPP access networks 114 can include one or more trusted WLANs 118 and one or more untrusted WLANs 120. The trusted WLANs 118 can include WLANs that are deployed by or on behalf of a mobile network operator, such as the mobile network operator associated with the 3GPP access networks 108. The trusted WLANs 118 can include one or more trusted WLAN access points ("APs") 122, which can be implemented, for example, as standalone access points, wireless routers, or a combination thereof. The trusted WLANs 118 can communicate directly with a core network 124. The untrusted WLANs 120 can include WLANs that are deployed by or on behalf of an entity other than the mobile network operator. For example, a user 126 (associated with the UE 102) may have an untrusted WLAN 120 at their home or office. Similarly, for example, a business may offer WI-FI access to its customers through an untrusted WLAN 120. The untrusted WLANs 120 can include one or more untrusted WLAN APs 128, which can be implemented, for example, as standalone access points, wireless routers, or a combination thereof.

The core network 124 can include a packet core network, an evolved packet core ("EPC") network, a 5G core network, a control-plane/user-plane packet network, or a combination thereof. The core network 124, in turn, can be in communication with one or more other networks 130, such as one or more public land mobile networks ("PLMNs"), one or more packet data networks ("PDNs"), combinations thereof, and/or the like. The core network 124 can also be in communication with the Internet 132. The 3GPP access networks 108 and the trusted WLAN 118 can connect directly to the core network 124 via one or more transport networks (not shown); and more specifically to a mobility management entity ("MME") 134, to a serving gateway ("SGW") 136, and/or to a packet gateway ("PGW") 144. The untrusted WLAN 120 can connect to the core network 124 through the Internet 132 and an evolved packet data gateway ("ePDG") 138. The core network 124 can also include an Authentication Authorization Accounting server ("AAA") 140, a home subscriber server ("HSS") 142, and a packet gateway ("PGW") 144. The core network 124 can include any number of MMES 134, SGWs 136, ePDG 138, AAAs 140, HSSs 142, and/or PGWs 144. These core network elements can be implemented as hardware, software, or a combination thereof. In general, the core network 124 and the core network elements described herein can be established based upon 3GPP standards specifications.

The core network elements of the core network 124 can be implemented as physical network functions ("PNFs") having hardware and software components. The core network elements of the core network 124 can additionally or alternatively be provided, at least in part, by virtual network functions ("VNFs") supported by an underlying software-defined network ("SDN") and network virtualization platform ("NVP") architecture. For example, the core network elements can be realized as VNFs that utilize a unified commercial-of-the-shelf ("COTS") hardware and flexible resources shared model with the application software for the respective core network components running on one or more virtual machines ("VMs"). Moreover, the core network elements can be embodied as VNFs in one or more VNF pools, each of which can include a plurality of VNFs providing a particular core network function. Similarly, elements of the 3GPP access network(s) 108 and/or the non-3GPP access network(s) 114 can be implemented, at least in part, via VNFs. An example virtualized cloud architecture 600 that is capable of supporting virtualization technologies is described herein with reference to FIG. 6.

The MME 134 can be configured in accordance with 3GPP standards specifications and can perform operations to control signaling traffic related to mobility and security for access to the base station 116. The MME 134 can be in communication with the SGW 136 and the HSS 142. These interfaces are defined as part of 3GPP standards specifications.

The SGW 136 and the PGW 144 can be configured in accordance with 3GPP standards specifications. The SGW 136 can provide a point of interconnect between the radio-side (e.g., the base station 116 of the 3GPP access network 108) and the core network 124. The SGW 136 can serve the UE 102 by routing incoming and outgoing IP packets between the 3GPP access network 108 and the core network 124. The PGW 144 interconnects the core network 124 to the other network(s) 130 and the Internet 132. The PGW 144 routes IP packets to and from the other network(s) 130 and the Internet 132. The PGW 144 also performs operations such as IP address/prefix allocation, policy control, and charging. The SGW 136 and the PGW 144 can be combined in some implementations. These interfaces are defined as part of 3GPP standards specifications.

The ePDG 138 can be configured in accordance with 3GPP standards specifications. The ePDG 138 enables a secure connection across the untrusted WLAN 120 between the UE 102 and the core network 124 via IPsec tunneling.

The AAA 140 can be configured in accordance with 3GPP standards specifications. The AAA 140 performs authentication, authorization, and accounting functions for the core network 124. The AAA 140 can authenticate access from the untrusted WLAN 120 via extensible authentication protocol authentication and key agreement ("EAP-AKA"). The AAA 140 can coordinate with the HSS 142 as needed to authenticate the user 126.

The HSS 142 can be configured in accordance with 3GPP standards specifications. The HSS 142 is a database that contains user-related information for users of devices, such as the user 126 of the UE 102. The HSS 142 can provide support functions to the MME 134 for mobility management, call and data session setup, user authentication, and access authorization.

As mentioned above, the UE 102 has either lost connection to the 3GPP access network 108 or the strength of the signal received from the 3GPP access network 108 is below a pre-defined threshold (e.g., below −100 decibels) such that the voice call 110 may be degraded or unable to be completed, or may be better served by the trusted WLAN 118 or the untrusted WLAN 120. The UE 102 can choose to attach to the core network 124 through the non-3GPP access network 114 as a VoWIFI call 110' instead of through the 3GPP access network 108 (e.g., as the voice call 110 such as a VoLTE call or similar) to avoid issues such as those described above. If the UE 102 attaches through the trusted WLAN 118 or the untrusted WLAN 120, the UE 102 signaling and/or voice packets, for example, can be routed through the Internet 132 via an IPsec tunnel established between the UE 102 and the ePDG 138.

In accordance with the concepts and technologies disclosed herein, the UE 102 and the untrusted WLAN AP 128 can be provisioned with hidden SSID information 145 for how to configure a hidden SSID over which the UE 102 can connect the VoWIFI call 110'. In particular, the UE 102 can be provisioned with the hidden SSID information 145, including an SSID name, to be used by a VoWIFI UE application 146 to identify and connect to the untrusted WLAN AP 128 without a password or other standard security credentials. Likewise, the untrusted WLAN AP 128 can be provisioned with the hidden SSID information 145 to be used by a VoWIFI auto-connect application 148 for configuring a wireless network (e.g., the untrusted WLAN 120) over which the UE 102 can connect using the hidden SSID information 145 also provisioned on the UE 102.

The UE 102 can enable a VoWIFI service in the VoWIFI UE application 146. The VoWIFI UE application 146 can be implemented as a standalone application or a feature implemented within an operating system of the UE 102. After enabling the VoWIFI service, the mobile network operator can provision the UE 102 with the hidden SSID information 145 corresponding to the SSIDs to be acknowledged by the untrusted WLAN AP 128. This provisioning can be a one-time provisioning process, or can be performed each time the VoWIFI service is enabled. The UE 102 may be re-provisioned from time-to-time with a new set of hidden SSID(s). The frequency with which the UE 102 is provisioned can be determined by the mobile network operator. The untrusted WLAN AP 128 can be provisioned as part of one-time provisioning process or as needed.

The UE 102 can generate, via the VoWIFI UE application 146, a hidden SSID request 149 to probe the untrusted WLAN 120 with the previously-provisioned hidden SSID information 145. If the untrusted WLAN AP 128 responds to the hidden SSID request 149 with a hidden SSID response 150 indicating that the untrusted WLAN AP 128 is configured for a VoWIFI auto-connect feature, the UE 102 can, in turn, generate, via the VoWIFI UE application 146, an access request 151 that includes SIM data 152, such as an IMSI, that uniquely identifies the user (subscriber) 126 to the core network 124. The UE 102 can send the access request 151 to the untrusted WLAN AP 128. The untrusted WLAN AP 128 can receive the access request 151 and can generate an authentication request 154, which can be forwarded to the ePDG 138. The ePDG 138 can generate an authentication challenge 155 directed to the UE 102. The ePDG 138 can send the authentication challenge 155 to the untrusted WLAN AP 128, which, in turn, can forward the authentication challenge 155 to the UE 102. The UE 102 can respond to the authentication challenge 155 with an authentication challenge response 156, which the untrusted WLAN AP 128 can receive and forward to the ePDG 138.

The untrusted WLAN AP 128 can receive an authentication response 157 from the ePDG 138. The authentication response 157 can identify whether the access request 151 has been allowed or denied. If the access request 151 has been allowed, the authentication response 157 can inform (shown as allow notification 158) the VoWIFI auto-connect application 148 to allow the UE 102 to register with the core network 124 and allocate the WLAN resources required to handle the VoWIFI call 110'. It should be understood that although a single VoWIFI call 110' is shown, the UE 102 can originate or terminate any number of VoWIFI calls 110' after registration with the core network 124. Moreover, the UE 102 may be prompted to re-register after a specified time period, after a specified number of VoWIFI calls 110', or some other variable. If the authentication request 154 has been denied, the authentication response 157 can inform (shown as deny notification 160) the VoWIFI auto-connect application 148 to deny the UE 102 attachment to the untrusted WLAN 120. The VoWIFI auto-connection application 148 can, in turn, generate an access response 162 and send the access response 162 to the UE 102 in reply to the access request 151 to inform the UE 102 of whether UE 102 attachment to the untrusted WLAN 120 has been allowed or denied.

Figure 2A:
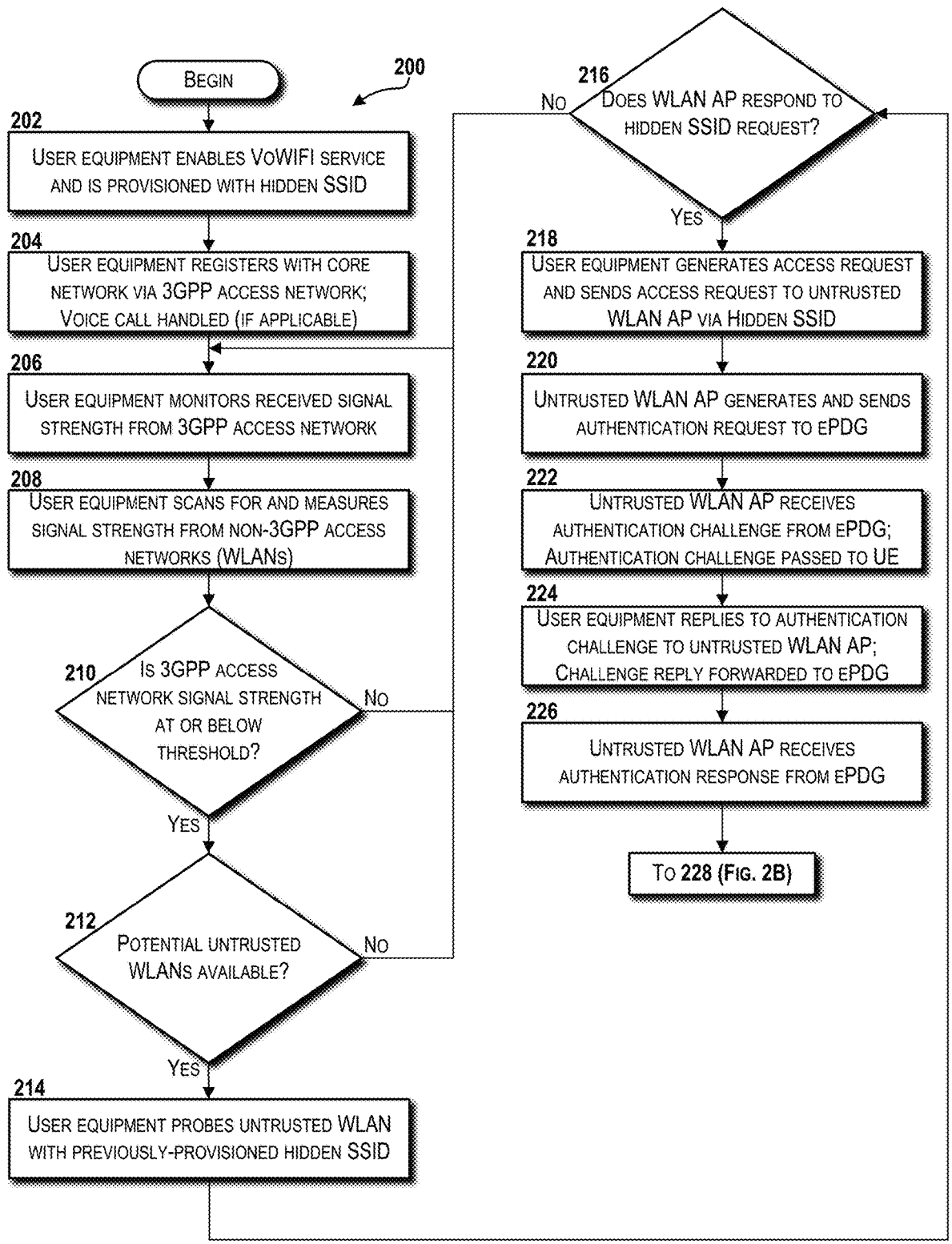
FIGS. 2A-2B are flow diagrams illustrating aspects of a method for automatically attaching to an untrusted non-3GPP WLAN to make or receive a VoWIFI call and/or other communications, according to an illustrative embodiment of the concepts and technologies disclosed herein.
Figure 2B:
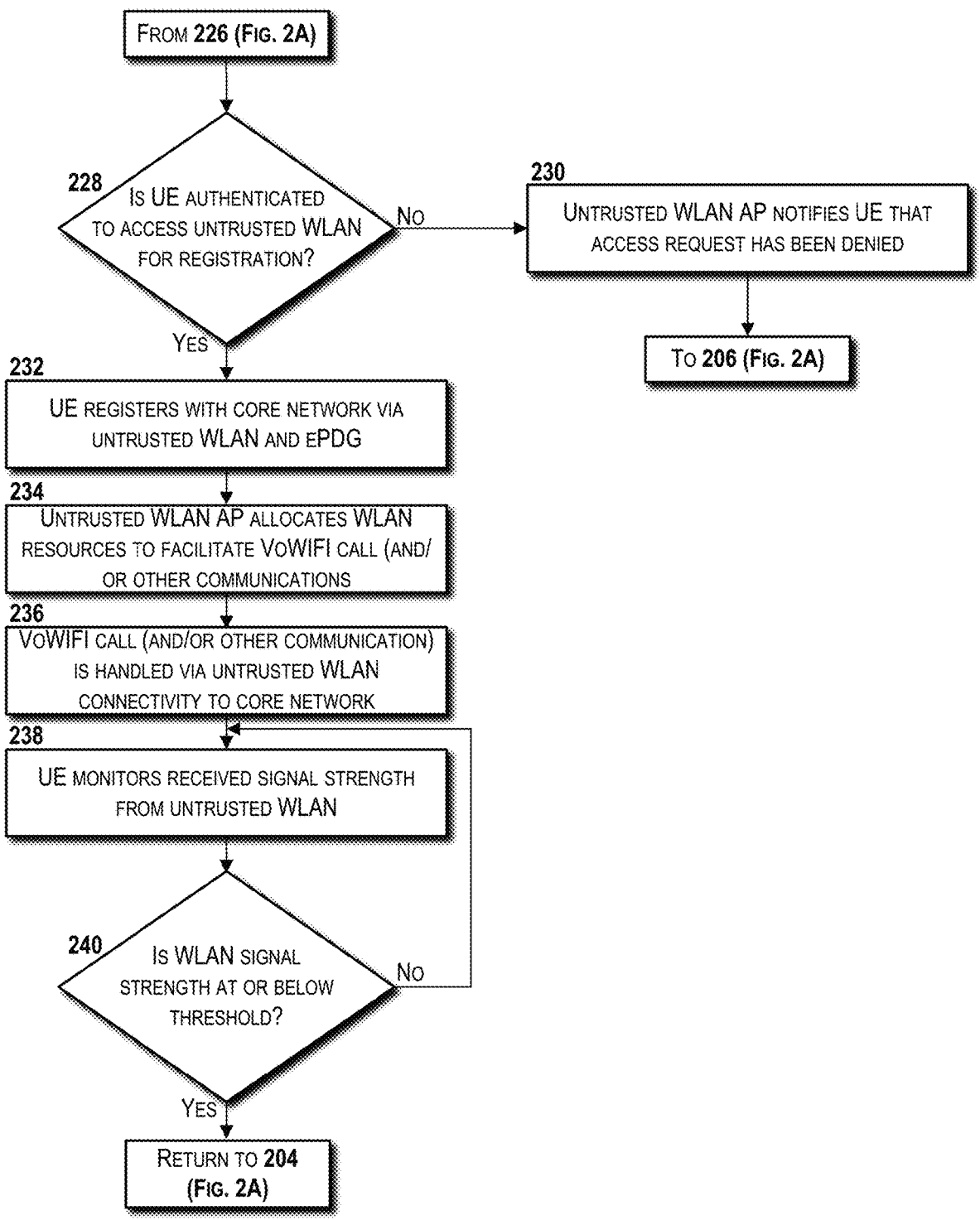

Turning now to FIGS. 2A-2B, flow diagrams illustrating aspects of a method 200 for automatically attaching to an untrusted WLAN, such as the untrusted WLAN 120 will be described, according to an illustrative embodiment. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the UE 102 enables VoWIFI service in the VoWIFI UE application 146. As noted above, the VoWIFI UE application 146 can be implemented as a standalone application or a feature implemented within the operating system of the UE 102. After enabling the VoWIFI service, the UE 102 can be provisioned with the hidden SSID information 145. This provisioning can be performed as part of a one-time provisioning process, or can be performed each time the VoWIFI service is enabled. The UE 102 may be re-provisioned from time-to-time with a new set of hidden SSID(s). The frequency with which the UE 102 is provisioned can be determined by the mobile network operator.

From operation 202, the method 200 proceeds to operation 204. At operation 204, the UE 102 registers with the core network 124 via the 3GPP access network 108. After the UE 102 is registered with the core network 124 via the 3GPP access network 108, the UE 102 can originate or terminate voice calls (e.g., the voice call 110) and/or other communications (e.g., messaging) via the 3GPP access network 108.

From operation 204, the method 200 proceeds to operation 206. At operation 206, the UE 102 monitors the 3GPP access network signal strength from the 3GPP access network 108. The mobile network operator may specify a 3GPP access network signal strength threshold from the 3GPP access network 108. The mobile network operator can update the UE 102 with the 3GPP access network signal strength threshold. The mobile network operator can define the 3GPP access network signal strength threshold as a static value. Alternatively, the mobile network operator can define the 3GPP access network signal strength threshold as a dynamic value that can be changed based upon other network conditions/considerations. Moreover, other network metrics can be considered as an alternative to or in addition to signal strength, such as signal quality, for example.

From operation 206, the method 200 proceeds to operation 208. At operation 208, the UE 102 scans for and measures the signal strength from any non-3GPP access network(s) 114 (e.g., WLANs 118, 120). From operation 208, the method 200 proceeds to operation 210. At operation 210, the UE 102 determines if the 3GPP access network signal strength from the 3GPP access network 108 (as monitored at operation 206) is at or below the 3GPP access network signal strength threshold. If the UE 102 determines that the 3GPP access network signal strength from the 3GPP access network 108 is not at or below the 3GPP access network signal strength threshold, the method 200 returns to operation 206 and the UE 102 continues to monitor the 3GPP access network signal strength from the 3GPP access network 108. If, however, the UE 102 determines that the 3GPP access network signal strength from the 3GPP access network 108 is at or below the 3GPP access network signal strength threshold, the method 200 proceeds to operation 212.

At operation 212, the UE 102 determines if any potential untrusted WLANs (e.g., the untrusted WLAN 120) are available. If the UE 102 determines that no potential untrusted WLANs are available, the method 200 returns to operation 206 and the UE 102 continues to monitor the 3GPP access network signal strength from the 3GPP access network 108. If, however, the UE 102 determines that at least one potential untrusted WLAN (e.g., the untrusted WLAN 120) is available, the method 200 proceeds to operation 214. At operation 214, the UE 102 probes the untrusted WLAN 120 with the hidden SSID information 145 via a hidden SSID request 149.

From operation 214, the method 200 proceeds to operation 216. At operation 216, the UE 102 determines if the untrusted WLAN AP 128 responds to the hidden SSID request 149. If the UE 102 determines that the untrusted WLAN AP 128 does not respond to the hidden SSID request 149, the method 200 returns to operation 206 and the UE 102 continues to monitor the 3GPP access network signal strength from the 3GPP access network 108. If, however, the UE 102 determines that the untrusted WLAN AP 128 responds to the hidden SSID request 149 with a hidden SSID response 150, the method 200 proceeds to operation 218.

At operation 218, the UE 102 generates the access request 151 and sends the access request 151 to the untrusted WLAN AP 128 via the hidden SSID. From operation 218, the method 200 proceeds to operation 220. At operation 220, the untrusted WLAN AP 128 generates and sends an authentication request 154 to the ePDG 138. From operation 220, the method 200 proceeds to operation 222. At operation 222, the untrusted WLAN AP 128 receives an authentication challenge 155 (e.g., based upon the SIM data 152) from the ePDG 138 and passes the authentication challenge 155 to the UE 102. From operation 222, the method 200 proceeds to operation 224. At operation 224, the UE 102 replies to the authentication challenge 155 with an authentication challenge response 156 directed to the untrusted WLAN AP 128, which, in turn, forwards the authentication challenge response 156 to the ePDG 138. From operation 224, the method 200 proceeds to operation 226. At operation 226, the untrusted WLAN AP 128 receives an authentication response 157 from the ePDG 138. From operation 226, the method 200 proceeds to operation 228 shown in FIG. 2B.

Turning to FIG. 2B, and particularly operation 228, the untrusted WLAN AP 128 determines whether the UE 102 is authenticated to access the untrusted WLAN 120 for registration to the core network 124. If the untrusted WLAN AP 128 determines, based upon the authentication response 157, that the UE 102 is not authenticated to access the untrusted WLAN 120, the method 200 proceeds to operation 230. At operation 230, the untrusted WLAN AP 128 notifies the UE 102 that the access request 151 has been denied. From operation 230, the method 200 returns to FIG. 2A, and particularly operation 206. The method 200 can then proceed as described above. If the untrusted WLAN AP 128 determines, based upon the authentication response 157, that the UE 102 is authenticated to access the untrusted WLAN 120 for registration to the core network 124, the method 200 proceeds to operation 232. At operation 232, the UE 102 registers with the core network 124 via the untrusted WLAN 120 and the ePDG 138. From operation 232, the method 200 proceeds to operation 234. At operation 234, the untrusted WLAN AP 128 allocates WLAN resources to facilitate the VoWIFI call 110' and/or other communication(s), such as messaging, as the case may be. From operation 234, the method 200 proceeds to operation 236. At operation 236, the VoWIFI call 110' and/or other communication(s) is/are handled via the untrusted WLAN 120 connectivity to the core network 124. From operation 236, the method 200 proceeds to operation 238.

At operation 238, the UE 102 monitors the WLAN signal strength from the untrusted WLAN 120. The mobile network operator may specify a WLAN signal strength threshold for the WLAN signal strength received from the untrusted WLAN 120. The mobile network operator can update the UE 102 with the WLAN signal strength threshold. The mobile network operator can define the WLAN signal strength threshold as a static value. Alternatively, the mobile network operator can define the WLAN signal strength threshold as a dynamic value that can be changed based upon other network conditions/considerations.

From operation 238, the method 200 proceeds to operation 240. At operation 240, the UE 102 determines if the WLAN signal strength is at or below a WLAN signal strength threshold. If the UE 102 determines that the WLAN signal strength received from the untrusted WLAN 120 is not at or below the threshold, the method 200 returns to operation 238 and the UE 102 continues to monitor the WLAN signal strength from the untrusted WLAN 120. If, however, the UE 102 determines that the WLAN signal strength from the untrusted WLAN 120 is at or below the threshold, the method 200 returns to operation 204 in FIG. 2A, and the method 200 proceeds as described above.

Figure 3:
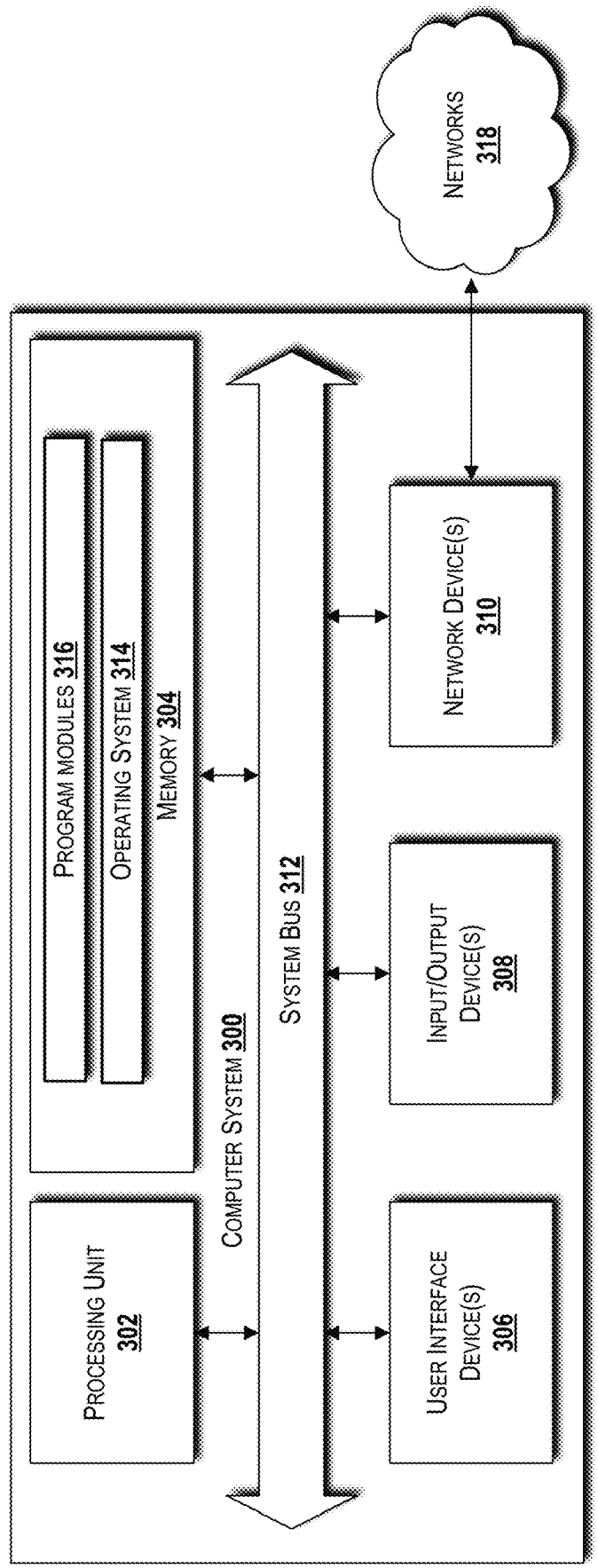
FIG. 3 is a block diagram illustrating an example computer system capable of implementing aspects of the concepts and technologies disclosed herein.

Turning now to FIG. 3, a block diagram illustrating a computer system 300 configured to provide the functionality described herein in accordance with various embodiments. In some embodiments, aspects of the UE 102, the trusted WLAN AP 122, the untrusted WLAN AP 128, the SGW 136, the MME 134, the ePDG 138, the PGW 144, the HSS 142, and the AAA 140, operating on or in communication with the other network(s) 130, and/or systems operating on or in communication with the Internet 132 can be configured the same as or similar to the computer system 300.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 316 may include various software and/or program modules described herein. The program modules 316 can include the VoWIFI UE application 146 in an embodiment of the UE 102 configured the same as or similar to the computer system 300. The program modules 316 can include the VoWIFI auto-connect application 148 in an embodiments of the untrusted WLAN AP 128 configured the same as or similar to the computer system 300. In some embodiments, multiple implementations of the computer system 300 can be used, wherein each implementation is configured to execute one or more of the program modules 316. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof. The memory 304 also can be configured to store the hidden SSID information 145, the SIM data 152, the access request 151, the access response 162, the authentication request 154, the authentication response 157, data associated with the VoWIFI call 110', other data disclosed herein, or a combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touch-sensitive surface, or an electronic stylus. Further, the I/O devices 308 may include one or more output devices.

The network devices 310 enable the computer system 300 to communicate with one or more networks 318 such as any of the networks described herein. Examples of the network devices 310 include, but are not limited to, a modem, a radio frequency ("RF") or infrared ("IR") or ultraviolet ("UV") transceiver, a telephonic interface, a bridge, a router, or a network card. The network 318 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 318 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
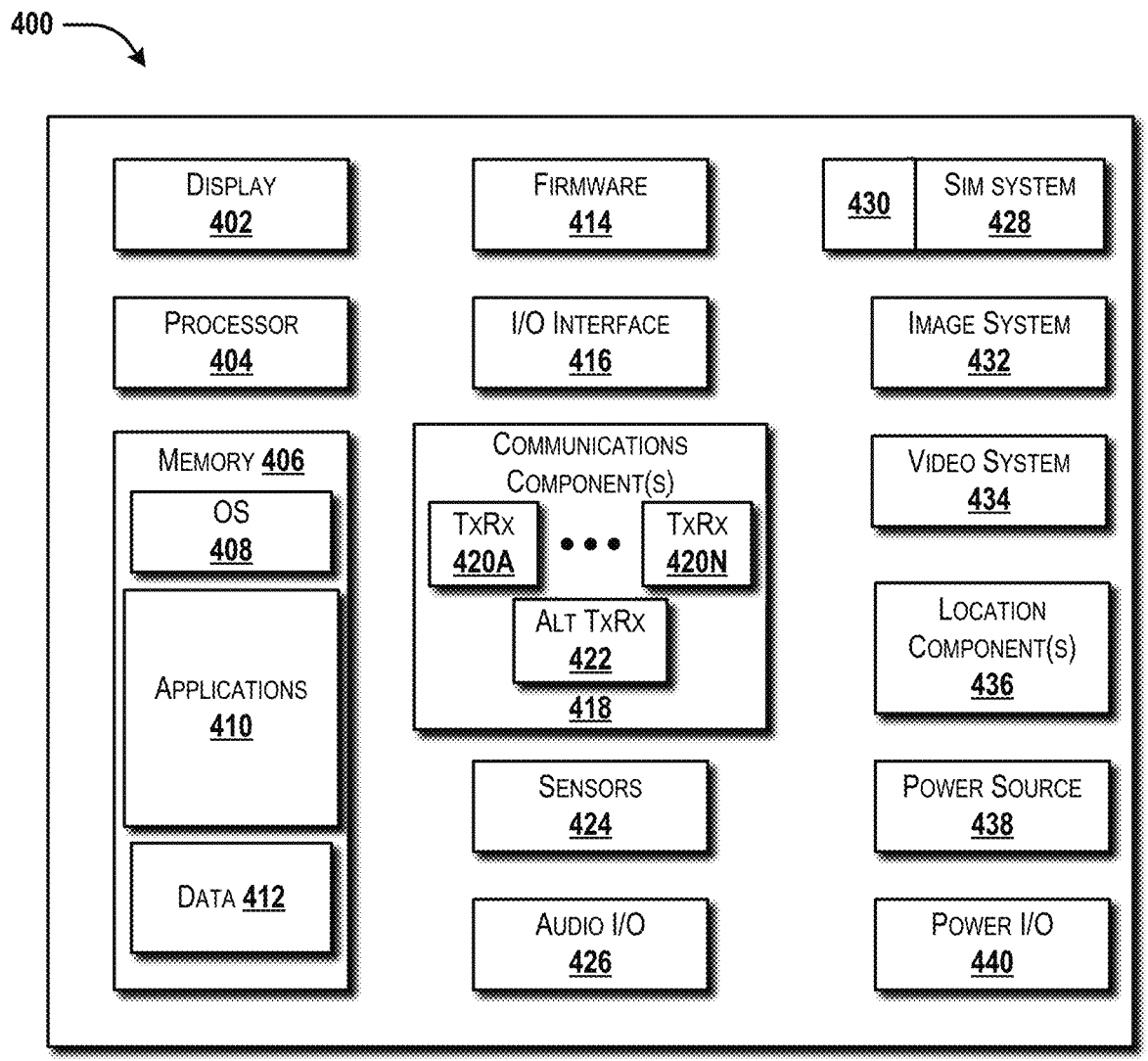
FIG. 4 is a block diagram illustrating an example mobile device capable of implementing aspects of the concepts and technologies disclosed herein.

Turning now to FIG. 4, an illustrative mobile device 400 and components thereof will be described. In some embodiments, the UE 102 can be configured the same as or similar to the mobile device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 can also include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. The applications 410 can include the VoWIFI UE application 146. In some embodiments, the applications 410 can also include a UI application (not illustrated in FIG. 4). The memory 406 can also store the hidden SSID information 145, the SIM data 152, the access request 151, the access response 162, the authentication request 154, the authentication response 156, other data disclosed herein, or a combination thereof.

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 can also store code for execution during device power up and power down operations. It can be appreciated that the firmware 414 can be stored in a volatile or non-volatile data storage device including, but not limited to, the memory 406 and/or a portion thereof.

The mobile device 400 can also include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 can also include a communications component 418. The communications component 418 can be configured to interface with the processor 404 to facilitate wired and/or wireless communications with one or more networks, such as the wireless access networks 104, the Internet 132, the other network(s) 130, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using GSM, CDMA CDMAONE, CDMA2000, LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, TDMA, FDMA, CDMA, W-CDMA, OFDMA, SDMA, and the like.

In addition, the communications component 418 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 5G technologies and standards, and various other current and future wireless data access technologies and standards. In the illustrated embodiment, the communications component 418 can include a first transceiver ("TxRx") 420A, such as the radio access component(s) 106, that can operate in a first communications mode (e.g., GSM). The communications component 418 can also include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 can also include an alternative transceiver ("Alt TxRx") 422, such as the WLAN component(s) 112, for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 can also facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 can also include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 can also include a subscriber identity module ("SIM") system 428. The SIM system 428 can include a universal SIM ("USIM"), a universal integrated circuit card ("UICC"), embedded SIM ("eSIM"), and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Additionally, or alternatively, an embedded SIM may be used. Because other devices and/or modules for identifying users and/or the mobile device 400 are contemplated, it should be understood that these embodiments are illustrative, and should not be construed as being limiting in any way.

The mobile device 400 can also include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content can also be shared with other devices via various types of data transfers via wired and/or wireless communication devices as described herein.

The mobile device 400 can also include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 can also be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 can also include a power source 438. The power source 438 can include one or more batteries, power supplies, power cells, and/or other power subsystems including alternating current ("AC") and/or direct current ("DC") power devices. The power source 438 can also interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
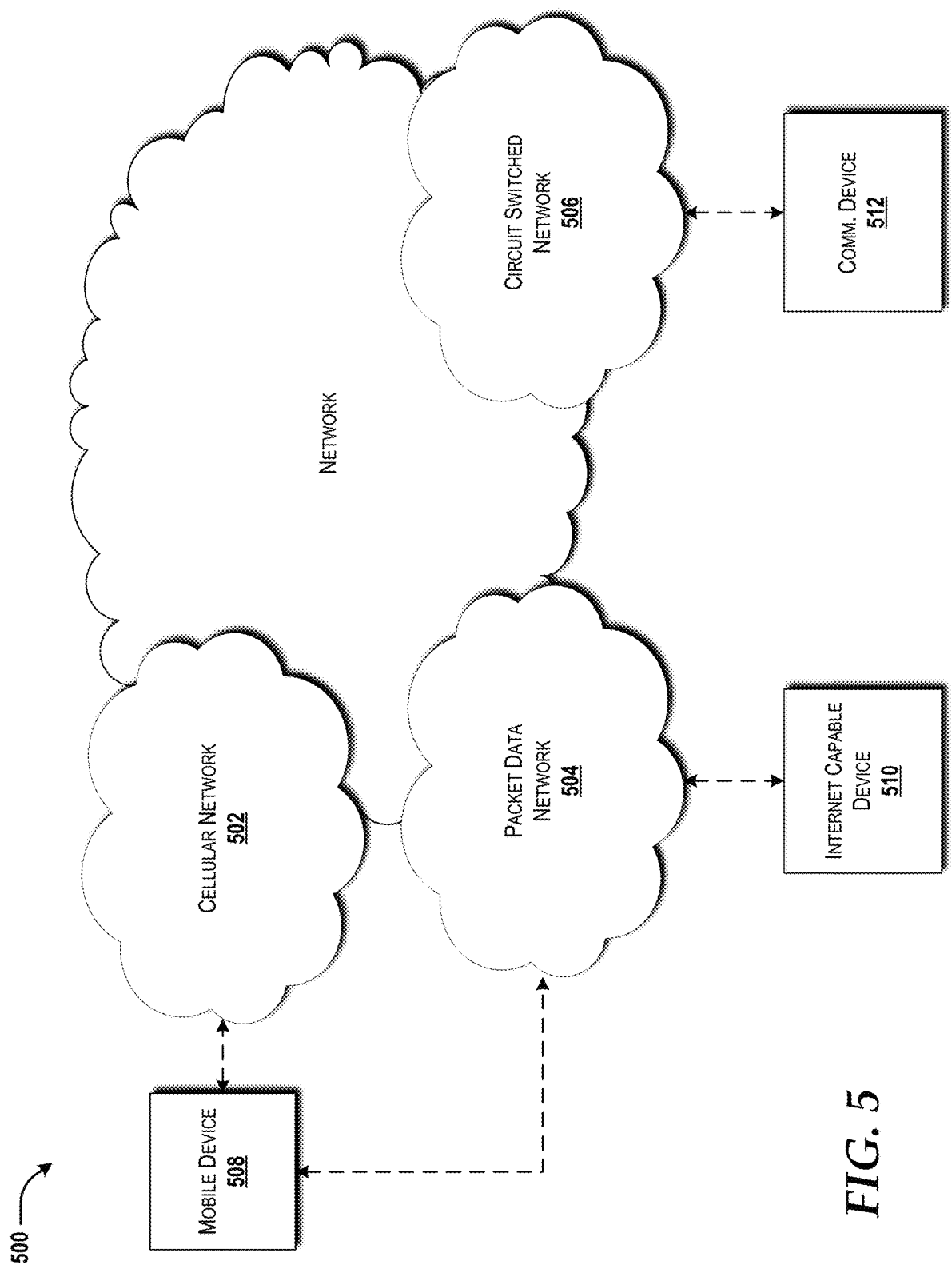
FIG. 5 is a block diagram illustrating an example network capable of implementing aspects of the concepts and technologies disclosed herein.

Turning now to FIG. 5, details of a network 500 are illustrated, according to an illustrative embodiment. The network 500 includes a cellular network 502 (e.g., the 3GPP access networks 108 and the core network 124), a packet data network 504 (e.g., the other network(s) 130 and/or the Internet 132), and a circuit switched network 506 (e.g., a public switched telephone network). The cellular network 502 includes various components such as, but not limited to, base stations 116, base transceiver stations ("BTSs"), NBs, eNBs, gNBs, base station controllers ("BSCs"), radio network controllers ("RNCs"), mobile switching centers ("MSCs"), MMEs 134, SGWs 136, ePDGs 138, AAA servers 140, HSSs 142, PGWs 144, short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, EPC core network components, 5G core network components, future generation core network components, location service nodes, virtualizations thereof, combinations thereof, and/or the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the UE 102, the mobile device 400, a cellular telephone, a user equipment, a mobile terminal, a PDA, a laptop computer, a handheld computer, and combinations thereof, can be operatively connected to the cellular network 502 and/or the packet data network 504. The mobile communications device 508 can be configured similar to or the same as the mobile device 400 described above with reference to FIG. 4.

The cellular network 502 can be configured as a GSM network and can provide data communications via GPRS and/or EDGE. Additionally, or alternatively, the cellular network 502 can be configured as a 3G UMTS network and can provide data communications via the HSPA protocol family, for example, HSDPA, EUL, and HSPA+. The cellular network 502 also is compatible with mobile communications standards such as LTE, 5G-NR, or the like, as well as evolved and future mobile standards.

The packet data network 504 includes various systems, devices, servers, computers, databases, and other devices in communication with one another, as is generally known. In some embodiments, the packet data network 504 is or includes one or more WI-FI networks such as the trusted WLAN 118 and the untrusted WLAN 120, each of which can include one or more WI-FI access points such as the trusted WLAN AP 122, the untrusted WLAN AP 128, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510 such as a laptop, a portable device, or another suitable device, can communicate with one or more cellular networks 502, and devices connected thereto, through the packet data network 504. It also should be appreciated that the mobile device 508, such as the UE 102, can communicate directly with the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
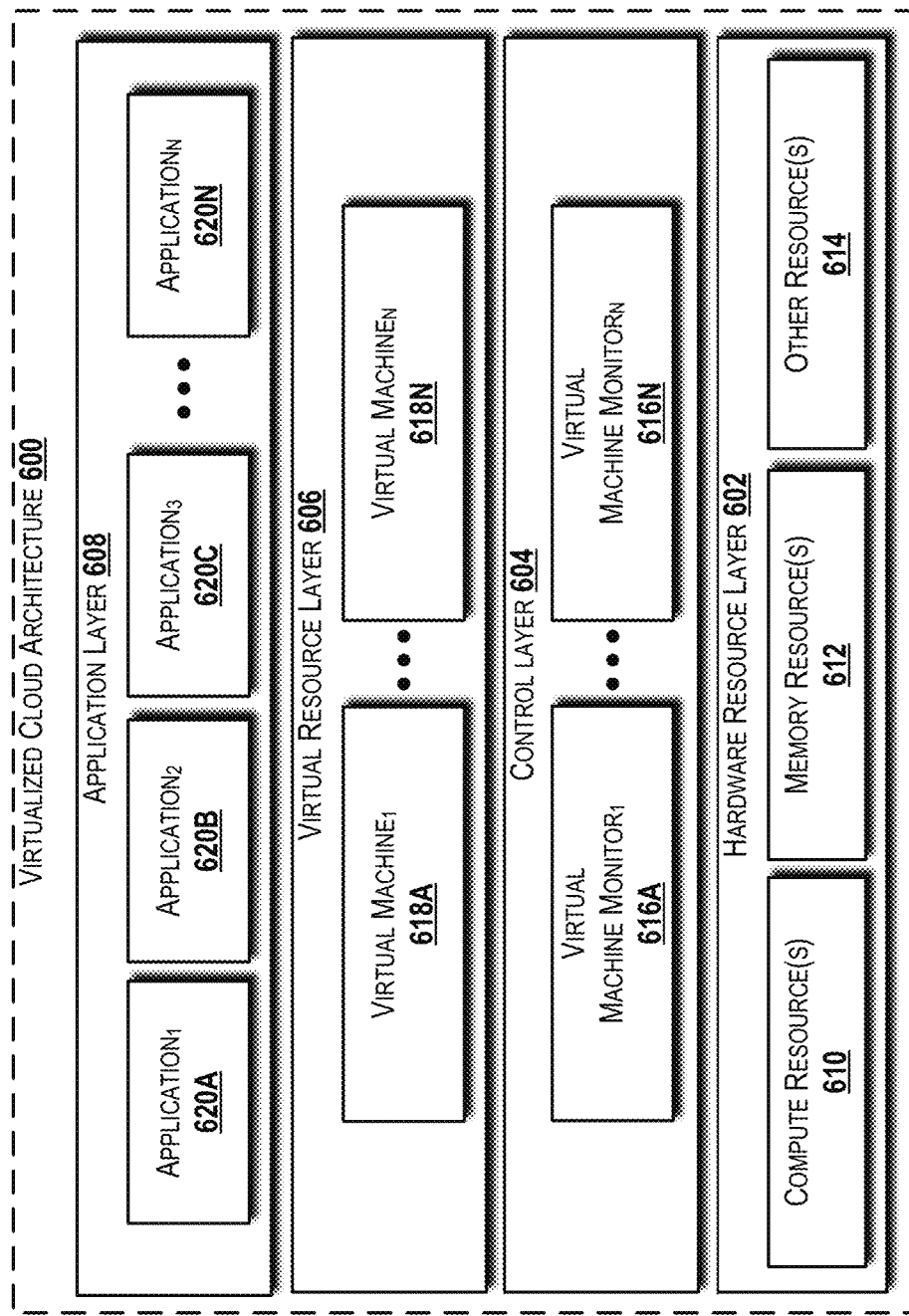
FIG. 6 is a block diagram illustrating a virtualized cloud architecture capable of implementing aspects of the concepts and technologies disclosed herein.

Turning now to FIG. 6, a block diagram illustrating an example virtualized cloud architecture 600 and components thereof will be described, according to an exemplary embodiment. In some embodiments, the virtualized cloud architecture 600 can be utilized to implement, at least in part, the core network 124, the 3GPP access network(s) 108, the wireless access networks 104, the non-3GPP access network(s) 114, the trusted WLAN 118, the untrusted WLAN 120, or portions thereof. The virtualized cloud architecture 600 is a shared infrastructure that can support multiple services and network applications. The illustrated virtualized cloud architecture 600 includes a hardware resource layer 602, a control layer 604, a virtual resource layer 606, and an application layer 608 that work together to perform operations as will be described in detail herein.

The hardware resource layer 602 provides hardware resources, which, in the illustrated embodiment, include one or more compute resources 610, one or more memory resources 612, and one or more other resources 614. The compute resource(s) 610 can include one or more hardware components that perform computations to process data, and/or to execute computer-executable instructions of one or more application programs, operating systems, and/or other software. The compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 610 can be or can include one or more hardware components architected in accordance with an advanced reduced instruction set computing ("RISC") machine ("ARM") architecture, available for license from ARM HOLDINGS. Alternatively, the compute resources 610 can be or can include one or more hardware components architected in accordance with an x86 architecture, such an architecture available from INTEL CORPORATION of Mountain View, California, and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 616A-616N (also known as "hypervisors"; hereinafter "VMMs 616") operating within the control layer 604 to manage one or more virtual resources that reside in the virtual resource layer 606. The VMMs 616 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 610, the memory resources 612, the other resources 614, or any combination thereof. These abstractions are referred to herein as virtual machines ("VMs"). In the illustrated embodiment, the virtual resource layer 606 includes VMs 618A-618N (hereinafter "VMs 618"). Each of the VMs 618 can execute one or more applications 620A-620N in the application layer 608.

Based on the foregoing, it should be appreciated that aspects of automatic connectivity for VoWIFI calls have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   enabling, by a user equipment comprising a processor, a voice-over-WI-FI ("VoWIFI") service;
   receiving, by the user equipment, hidden service set identifier ("SSID") information;
   registering, by the user equipment, with a core network via a radio access network;
   monitoring, by the user equipment, a first signal strength of a first signal from the radio access network;
   scanning, by the user equipment, for a second signal from a wireless local area network ("WLAN"), and when the second signal is found, measuring a second signal strength of the second signal;

determining, by the user equipment, whether the first signal strength is at or below a first threshold;

in response to determining that the first signal strength is at or below the first threshold, determining, by the user equipment, if a WLAN is available and is an untrusted WLAN;

in response to determining that the WLAN is potentially an untrusted WLAN, probing, by the user equipment, the untrusted WLAN with the hidden SSID information;

determining, by the user equipment, whether an untrusted WLAN access point associated with the untrusted WLAN responds to the hidden SSID information;

in response to determining that the untrusted WLAN access point responds to the hidden SSID information, generating an access request and sending the access request to the untrusted WLAN access point using the hidden SSID information;

receiving, by the user equipment, via the untrusted WLAN access point, an authentication challenge from an evolved packet data gateway operating in the core network;

responding, by the user equipment, to the authentication challenge with an authentication response directed to the evolved packet data gateway; and in response to the user equipment being authenticated to access the untrusted WLAN for registration with the core network, registering, by the user equipment, with the core network via the untrusted WLAN and the evolved packet data gateway.

2. The method of claim 1, wherein receiving, by the user equipment, the hidden SSID information comprises receiving, by the user equipment, the hidden SSID information as part of a provisioning process, wherein the provisioning process further comprises provisioning the untrusted WLAN access point with the hidden SSID information.

3. The method of claim 1, wherein:
the radio access network comprises a Third Generation Partnership Program ("3GPP") access network; and
the untrusted WLAN comprises an untrusted non-3GPP access network.

4. The method of claim 1, wherein authentication is based, at least in part, upon subscriber identity module ("SIM") data.

5. The method of claim 1, further comprising completing, at least in part by the user equipment, a communication using WLAN resources allocated to the user equipment by the untrusted WLAN access point.

6. The method of claim 5, wherein the communication comprises a call.

7. The method of claim 5, wherein the communication comprises a message.

8. The method of claim 1, wherein enabling, by the user equipment, the VoWIFI service comprises:
enabling, by the user equipment, the VoWIFI service via a standalone VoWIFI application installed on the user equipment; or
enabling, by the user equipment, the VoWIFI service via an operating system setting available in an operating system installed on the user equipment.

9. A user equipment comprising:
a processor; and
a memory comprising instructions that, when executed by the processor, cause the processor to perform operations comprising enabling a voice-over-WI-FI ("VoWIFI") service,
receiving hidden service set identifier ("SSID") information,
registering with a core network via a radio access network,
monitoring a first signal strength of a first signal from the radio access network,
scanning for a second signal from a wireless local area network ("WLAN"), and when the second signal is found, measuring a second signal strength of the second signal,
determining whether the first signal strength is at or below a first threshold,
in response to determining that the first signal strength is at or below the first threshold, determining if a WLAN is available and is an untrusted WLAN,
in response to determining that the WLAN is potentially an untrusted WLAN, probing the untrusted WLAN with the hidden SSID information,
determining whether an untrusted WLAN access point associated with the untrusted WLAN responds to the hidden SSID information,
in response to determining that the untrusted WLAN access point responds to the hidden SSID information, generating an access request and sending the access request to the untrusted WLAN access point using the hidden SSID information,
receiving, via the untrusted WLAN access point, an authentication challenge from an evolved packet data gateway operating in the core network,
responding to the authentication challenge with an authentication response directed to the evolved packet data gateway, and
in response to the user equipment being authenticated to access the untrusted WLAN for registration with the core network, registering with the core network via the untrusted WLAN and the evolved packet data gateway.

10. The user equipment of claim 9, wherein receiving the hidden SSID information comprises receiving the hidden SSID information as part of a provisioning process, wherein the provisioning process further comprises provisioning the untrusted WLAN access point with the hidden SSID information.

11. The user equipment of claim 9, wherein authentication is based, at least in part, upon subscriber identity module ("SIM") data.

12. The user equipment of claim 9, wherein the operations further comprise completing, at least in part, a communication using WLAN resources allocated to the user equipment by the untrusted WLAN access point.

13. The user equipment of claim 12, wherein the communication comprises a call.

14. The user equipment of claim 12, wherein the communication comprises a message.

15. The user equipment of claim 9, wherein enabling the VoWIFI service comprises:
enabling the VoWIFI service via a standalone VoWIFI application installed on the user equipment; or
enabling the VoWIFI service via an operating system setting available in an operating system installed on the user equipment.

16. A computer-readable storage medium comprising computer-executable instructions that, when executed by a processor of a user equipment, cause the processor to perform operations comprising:

enabling a voice-over-WI-FI ("VoWIFI") service;
receiving hidden service set identifier ("SSID") information;
registering with a core network via a radio access network;
monitoring a first signal strength of a first signal from the radio access network;
scanning for a second signal from a wireless local area network ("WLAN"), and when the second signal is found, measuring a second signal strength of the second signal;
determining whether the first signal strength is at or below a first threshold;
in response to determining that the first signal strength is at or below the first threshold, determining if a WLAN is available and is an untrusted WLAN;
in response to determining that the WLAN is potentially an untrusted WLAN, probing the untrusted WLAN with the hidden SSID information;
determining whether an untrusted WLAN access point associated with the untrusted WLAN responds to the hidden SSID information;
in response to determining that the untrusted WLAN access point responds to the hidden SSID information, generating an access request and sending the access request to the untrusted WLAN access point using the hidden SSID information;
receiving, via the untrusted WLAN access point, an authentication challenge from an evolved packet data gateway operating in the core network;
responding to the authentication challenge with an authentication response directed to the evolved packet data gateway; and
in response to the user equipment being authenticated to access the untrusted WLAN for registration with the core network, registering with the core network via the untrusted WLAN and the evolved packet data gateway.

17. The computer-readable storage medium of claim 16, wherein receiving the hidden SSID information comprises receiving the hidden SSID information as part of a provisioning process, wherein the provisioning process further comprises provisioning the untrusted WLAN access point with the hidden SSID information.

18. The computer-readable storage medium of claim 16, wherein authentication is based, at least in part, upon subscriber identity module ("SIM") data.

19. The computer-readable storage medium of claim 16, wherein the operations further comprise completing, at least in part, a communication using WLAN resources allocated to the user equipment by the untrusted WLAN access point.

20. The computer-readable storage medium of claim 19, wherein the communication comprises a call or a message.

\* \* \* \* \*